(12) United States Patent
Karikallio

(10) Patent No.: US 12,237,964 B2
(45) Date of Patent: Feb. 25, 2025

(54) SYSTEM AND METHOD FOR OPTIMIZING FAULT DETECTION IN INTERNET OF THINGS NETWORK

(71) Applicant: Elisa Oyj, Helsinki (FI)

(72) Inventor: Henri Karikallio, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 18/703,563

(22) PCT Filed: Dec. 12, 2022

(86) PCT No.: PCT/FI2022/050825
§ 371 (c)(1),
(2) Date: Apr. 22, 2024

(87) PCT Pub. No.: WO2023/118648
PCT Pub. Date: Jun. 29, 2023

(65) Prior Publication Data
US 2024/0340217 A1  Oct. 10, 2024

(30) Foreign Application Priority Data
Dec. 21, 2021 (FI) ...................................... 20216315

(51) Int. Cl.
| H04L 41/0631 | (2022.01) |
| H04L 41/0681 | (2022.01) |
| H04L 41/16 | (2022.01) |
| H04L 41/5074 | (2022.01) |
| H04L 67/12 | (2022.01) |

(52) U.S. Cl.
CPC ...... *H04L 41/0631* (2013.01); *H04L 41/0681* (2013.01); *H04L 41/16* (2013.01); *H04L 41/5074* (2013.01); *H04L 67/12* (2013.01)

(58) Field of Classification Search
CPC . H04L 41/0631; H04L 41/0681; H04L 41/16; H04L 41/5074; H04L 67/12; G16Y 40/20
See application file for complete search history.

(56) References Cited

U.S. PATENT DOCUMENTS

2019/0182105 A1 6/2019 Stephens et al.
2019/0246444 A1* 8/2019 Kanzaki .............. H04W 36/322
(Continued)

FOREIGN PATENT DOCUMENTS

| CN | 111225407 A | 6/2020 |
| CN | 111682960 A | 9/2020 |

(Continued)

OTHER PUBLICATIONS

European Patent Office, The International Search Report and Written Opinion of the International Searching Authority, Application No. PCT/FI2022/050825, mailed Mar. 1, 2023, 16 pages.

(Continued)

*Primary Examiner* — Philip C Lee
(74) *Attorney, Agent, or Firm* — Ziegler IP Law Group, LLC.

(57) ABSTRACT

A method for optimizing fault detection in an Internet of Things (IoT) network includes determining a fault activity associated with an IoT device in IoT network; identifying a location information of IoT device; determining whether fault activity is associated with a mobile network corresponding to the location information; performing one of an automation activity of generating a service ticket for fault correction of mobile network, when fault activity is associated with mobile network, or generating a field service ticket for fault correction of the IoT device, when fault activity is not associated with mobile network. Disclosed also is a system for optimizing fault detection in an IoT network, system comprising a processor configured to perform the steps of the aforementioned method.

13 Claims, 2 Drawing Sheets

(56) References Cited

U.S. PATENT DOCUMENTS

2020/0272923 A1     8/2020  Banerjee et al.
2020/0374202 A1*   11/2020  Amrit ................. H04L 41/5074
2021/0226841 A1*    7/2021  Liu ..................... H04L 41/5009

FOREIGN PATENT DOCUMENTS

| CN | 112327100 A       | 2/2021 | |
|----|-------------------|--------|---|
| FI | 130741 B1         | 2/2024 | |
| WO | WO-2018022627 A1* | 2/2018 | ............. G06F 9/445 |

OTHER PUBLICATIONS

Finnish Patent and Registration Office, Patent Granted, Application No. 20216315, mailed Feb. 23, 2024, 2 pages.

Finnish Patent and Registration Office, Search Report, Application No. 20216315, mailed May 8, 2022, 2 pages.

Manzanilla-Salazar et al., "A Machine Learning Framework for Sleeping Cell Detection in a Smart-city IoT Telecommunications Infrastructure" ARXIV.org, Cornell University Library, IEEE Access, vol. 4, Oct. 2, 2019, DOI: 10.1109/ACCESS.2019.DOI, 14 pages.

Finnish Patent and Registration Office, Office Action, Application No. 20216315, mailed Aug. 23, 2023, 13 pages.

Moosedog Oy, Response to Office Action dated Aug. 23, 2023, Application No. 20216315, dated Jan. 2, 2024, 4 pages.

Finnish Patent and Registration Office, Office Action, Communication of Acceptance Application No. 20216315, Mailed Jan. 26, 2024, 10 pages.

Moosedog Oy, Response to Office Action, Communication of Acceptance dated Jan. 26, 2024, Application No. 20216315, Dated Feb. 20, 2024, 1 page.

\* cited by examiner

SYSTEM AND METHOD FOR OPTIMIZING FAULT DETECTION IN INTERNET OF THINGS NETWORK

TECHNICAL FIELD

The present disclosure relates generally to Internet of Things network; and more specifically, to methods for optimizing fault detection in Internet of Things networks. The present disclosure also relates to systems for optimizing fault detection in Internet of Things networks using the aforementioned methods.

BACKGROUND

Machine-to-machine (M2M) is a direct (wired or wireless) communication between two or more machines without direct human intervention (namely, autonomously). Typically, the M2M communication relies on software-controlled communication between the machines to trigger automated actions by machines from remote location. M2M communication finds application in security, tracking and tracing (such as intelligent transportation system, e-healthcare and the like), manufacturing and facility management (such as home area network, smart grids, and the like).

Over the past few years, Internet of Things (IoT) devices have being used with a network of M2M devices, shared data of which is processed remotely by the cloud servers. Typically, the IoT devices are embedded with sensors, software, for connecting and exchanging data with M2M devices over the network. The IoT devices provide continuous monitoring and earlier fault detection of the machines thereby building an efficient communication process. Typically, the detection and classification of faults is done based on the machine-learning techniques and artificial intelligence. However, in an automated network operation in IoT, when faults appear, it is difficult to know the root reason of the fault in the IoT environment, i.e. whether the fault is located in the IoT devices or in communication network. Moreover, automated network operation in IoT may cause disturbance/needless work, for example, when automated service ticket creation is not limited with certain conditions, or if the fault disappears from the IoT network but the automated service ticket is not cancelled from the process.

Therefore, in light of the foregoing discussion, there exists a need to overcome the aforementioned drawbacks associated with conventional automated Internet of Things network.

SUMMARY

The present disclosure seeks to provide a method for optimizing fault detection in an Internet of Things network. The present disclosure also seeks to provide a system for optimizing fault detection in an Internet of Things network. The present disclosure seeks to provide a solution to the existing problem of a fault detection in the Internet of Things network. An aim of the present disclosure is to provide a solution that overcomes at least partially the problems encountered in prior art, and provides fast, reliable, and efficient way of detecting fault in an Internet of Things network.

In one aspect, an embodiment of the present disclosure provides a method for optimizing fault detection in an Internet of Things network, the method comprising:
  determining a fault activity associated with an Internet of Things device in the Internet of Things network;
  identifying a location information of the Internet of Things device;
  determining whether the fault activity is associated with a mobile network corresponding to the location information, characterized in that the method determining whether the fault activity is associated with the mobile network corresponding to the location information comprises:
    sending as input, an automated message having the location information, by the Internet of Things platform to the mobile network automation system; and
    receiving as output, an automated message indicating whether the fault activity is associated with the mobile network, by the Internet of Things platform from the mobile network automation system;
  performing one of an automation activity of:
    generating a service ticket for fault correction of the mobile network, when the fault activity is associated with the mobile network, or
    generating a field service ticket for fault correction of the Internet of Things device, when the fault activity is not associated with the mobile network.

In another aspect, an embodiment of the present disclosure provides a system for optimizing fault detection in an Internet of Things network, the system comprising a processor configured to:
  determine a fault activity associated with an Internet of Things device in the Internet of Things network;
  identify a location information of the Internet of Things device;
  determine whether the fault activity is associated with a mobile network corresponding to the location information, characterized in that the processor is configured to determine whether the fault activity is associated with the mobile network corresponding to the location information by:
    sending as input, an automated message having the location information, by the Internet of Things platform to the mobile network automation system; and
    receiving as output, an automated message indicating whether the fault activity is associated with the mobile network, by the Internet of Things platform from the mobile network automation system;
  perform one of an automation activity of:
    generating a service ticket for fault correction of the mobile network, when the fault activity is associated with the mobile network, or
    generating a field service ticket for fault correction of the Internet of Things device, when the fault activity is not associated with the mobile network.

In yet another aspect, an embodiment of the present disclosure provides a computer program product for optimizing fault detection in an Internet of Things network, the computer program product comprising a non-transitory machine-readable data storage medium having stored thereon program instructions that, when accessed by a processor, cause the processor to carry out the aforementioned method.

Embodiments of the present disclosure substantially eliminate or at least partially address the aforementioned problems in the prior art, and enable optimizing fault detection in an Internet of Things network by automatedly generating service tickets or field tickets based on whether the fault activity is associated with the mobile network or not. Moreover, enabling a customer to experience fault free IoT environment.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
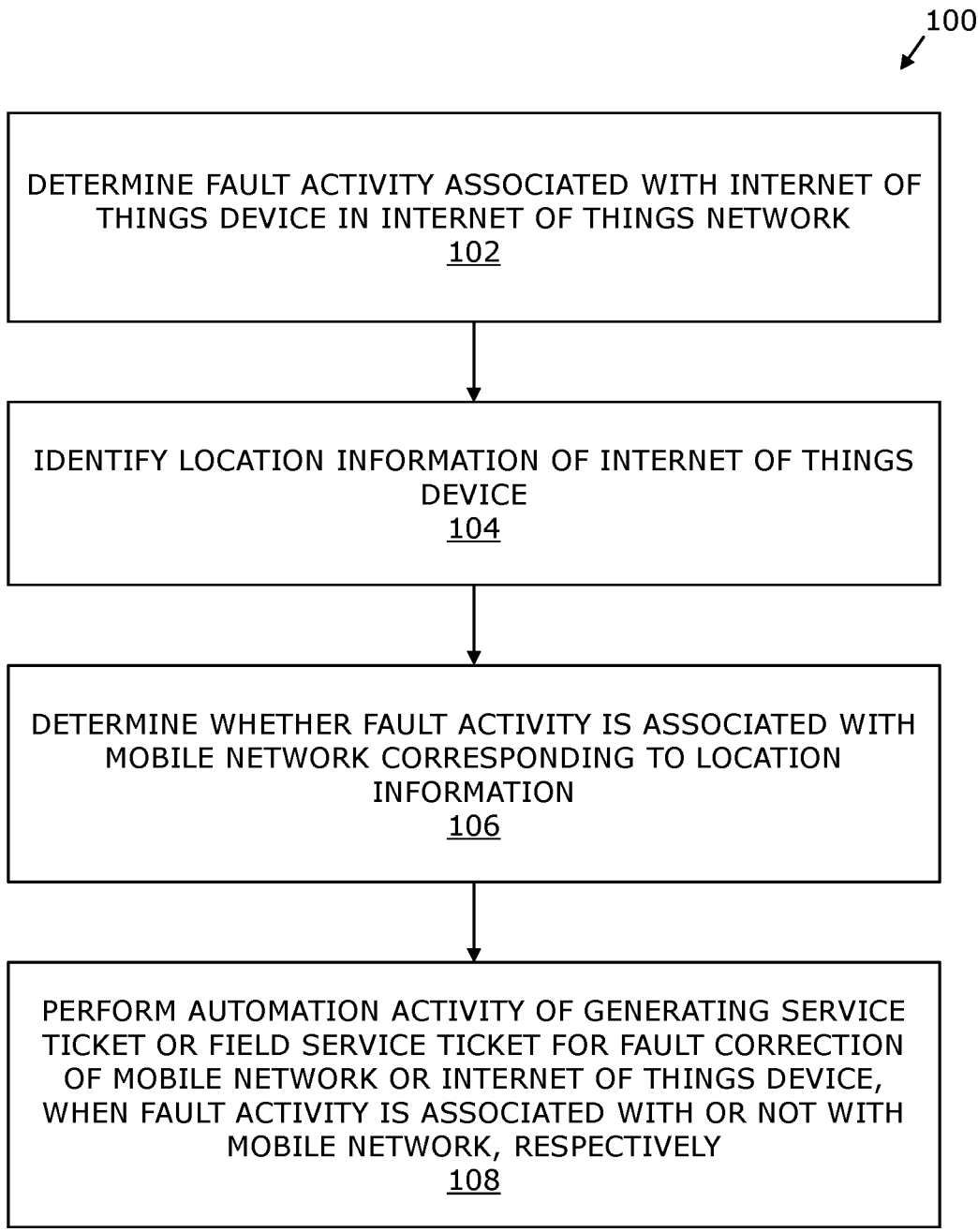
FIG. 1 is a flowchart of steps of a method for optimizing fault detection in an Internet of Things network, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method for optimizing fault detection in an Internet of Things network, the method comprising:
  determining a fault activity associated with an Internet of Things device in the Internet of Things network;
  identifying a location information of the Internet of Things device;
  determining whether the fault activity is associated with a mobile network corresponding to the location information;
  performing one of an automation activity of:
    generating a service ticket for fault correction of the mobile network, when the fault activity is associated with the mobile network, or
    generating a field service ticket for fault correction of the Internet of Things device, when the fault activity is not associated with the mobile network.

In another aspect, an embodiment of the present disclosure provides a system for optimizing fault detection in an Internet of Things network, the system comprising a processor configured to:
  determine a fault activity associated with an Internet of Things device in the Internet of Things network;
  identify a location information of the Internet of Things device;
  determine whether the fault activity is associated with a mobile network corresponding to the location information;
  perform one of an automation activity of:
    generating a service ticket for fault correction of the mobile network, when the fault activity is associated with the mobile network, or
    generating a field service ticket for fault correction of the Internet of Things device, when the fault activity is not associated with the mobile network.

In yet another aspect, an embodiment of the present disclosure provides a computer program product for optimizing fault detection in an Internet of Things network, the computer program product comprising a non-transitory machine-readable data storage medium having stored thereon program instructions that, when accessed by a processor, cause the processor to carry out the aforementioned method.

The present disclosure provides the aforementioned method and the aforementioned system for optimizing fault detection in an Internet of Things (hereafter referred to as 'IoT') network. The disclosed method and system allows machines or devices to be sensed or controlled remotely across existing network infrastructure, thereby resulting in improved, efficient, accurate and economical networks and reducing human intervention. Beneficially, the method predicts the fault activity associated with the IoT device using a machine learning model. Additionally, beneficially, the method for optimizing fault detection in an IoT network enables generating service tickets or field tickets based on whether the fault activity is associated with the mobile network or not. A technical effect of this is to differentiate between an error in IoT device or IoT network and communication network (mobile network). Communication network can be thus mobile network or also fixed line communication network such as Internet. In an example use case an IoT device is found to be non responsive. This non-responsiveness is determined to be a fault activity which is associated with the IoT device in the Iot network. Location of the IoT device is determined (or it can be predetermined) to be for example in certain postal code of a city (such as 20900 Turku i.e. downtown of Turku). After identifying that the said IoT device is non-responsive and the location of the non-resposive device is also determined (based on historical/database) it is determined if there is fault activity associated with a mobile network corresponding to the location information. I.e for example making a query to base station(s) in the said postal code area. If, based on the query base station(s) are not responding then a service ticket to fix connectivity on the said location (area) is generated. If, based on the query, the base station(s) are working fine, then faulty activity is associated with IoT device (i.e. if the fault activity is not associated with the mobile network). This way resources to fix problems can be alloctad in efficient way. Indeed the term "optimizing fault detection" may refer to eliminating at leasts one action in relation to detecting a fault. As an additional example, a scenario on which at least one IoT device is not resposive is presented. According to embodiments a mobile network functionaly is analysed in respect to known (determined, geographical) location of the target IoT device. If the mobile network is responsive, then a fault detection related service ticket can be directly allocated to the said IoT device. This way at least one action is eliminated i.e. generation of a service ticket related to connection via the mobile network.

Throughout the present disclosure, the term "Internet of Things" or "IoT" as used herein refers to a physical device (or groups of physical devices), referred to as IoT device, that is embedded with sensors, have processing ability, software, and other technologies that connect with other devices and networks and exchange data over the Internet or other suitable communication networks. Optionally, the IoT device may be a smartphone, a smartwatch, smart door locks, medical sensors, smart security sensors, a laptop, a computer, and the like. It will be appreciated that sensors of the IoT devices enable monitoring and detection of a change (referred to as a fault) within one or more devices in an environment of IoT (or IoT environment or IoT network). Typically, sensors detect an impending fault (namely, fault activity) and send alerts, to remove the fault or repair the fault. Beneficially, IoT is fast, reliable, allows to reduce operating costs and improve performance. For example, smartwatch, connected to the network, enables us to text, phone call, and do other work without any need for a smartphone via which the smartwatch is connected to the network.

The term "IoT network" as used herein refers to a collection of interconnected IoT devices that communicate with other IoT devices without the need for human intervention, such as autonomous cars, smart appliances, and wearable devices, and the like. Optionally, the IoT network comprises machine-to-machine (M2M) communication. It will be appreciated that the IoT network is an IoT environment having two or more devices connected over the communication network. Optionally, the communication network includes, but is not limited to, cellular communication, Wi-Fi, ZigBee, WiMAX, wireless LAN (WLAN), generic DSL (xDSL) and fiber to the x (FTTx), radiofrequency identification (RFID), Bluetooth, and sim cards (GSM and the like).

The term "fault detection" as used herein refers to detecting a failure or fault activity in a hardware system or a software system associated with the IoT network. Optionally, a software system may comprise a mobile network. Typically, during fault detection, a timestamp is captured at which the error or fault activity has occurred and an alarm is triggered requiring for a manual intervention or to initiate an automatic recovery for resolving the fault activity. In this regard, the captured timestamp helps the hardware system or the software system to monitor whether the fault activity, at the captured timestamp, is associated with the software system or the hardware system and send an alarm when disruptions are detected.

The term "fault activity" as used herein refers to a fault that appears in the IoT network or in the mobile network that causes a discomfort in a desired usage of the IoT device. Optionally, the fault activity arises when an end customer, associated with the one or more IoT devices, in the IoT network experiences a fault or a disturbance in the one or more IoT devices or the communication network associated therewith. The fault or the disturbance may be an interruption of the service or a problem in the IoT device. For example, when a user tries to operate an air conditioner using a software application through a smartphone and receives an alert or error message on the software application saying "Unable to operate", "An error occurred", "Please try again", and the like, in such case it is the fault activity which hampers the user experience. Typically, the fault activity may occur due to an in-operation fault in the IoT device or due to a faulty IoT device. A technical problem is to find if what is a root cause of user experience of faulty condition (Is it a device or a network related problem).

The term "location information" as used herein refers to information about the geographical position of the IoT device. Optionally, the location information may be in geodetic (latitude/longitude) or civic address format. It will be appreciated that the civic address may be at least one of: a city, a block, a street, a road name, a community name assigned to residential, commercial, institutional and industrial buildings. Optionally, the location information comprises at least one of: a coordinate, an address, an international mobile subscriber identity of the Internet of Things device. Optionally, location information may be obtained using an IP (internet protocol) address or an IoT device location. Moreover, the location information provides the exact or near-exact location of the IoT device having the fault activity associated therewith. Moreover, a unique number, referred to as the international mobile subscriber identity (IMSI) is assigned to every IoT device which may be used to determine the location of the IoT device.

The term "mobile network" as used herein refers to a communication network that links a group of devices to each other, thereby enabling the devices to communicate with each other and share information. In an example, the mobile network includes but not limited to, a Global System for Mobile Communications (GSM), Code-Civision Multiple Access (CDMA), Time-Division Multiple Access (TDMA), Frequency-Division Multiple Access (FDMA), Space-Division Multiple Access (SDMA), Advanced Mobile Phone System (AMPS), General Packet Radio Service (GPRS), Evolution-Data Optimized (EV-DO), Enhanced Data Rates for GSM Evolution (EDGE), Universal Mobile Telecommunications System (UMTS), Digital Enhanced Cordless Telecommunications (DECT), Integrated Digital Enhanced Network (iDEN), 2G, 3G, 4G, 5G, LTE, radio waves, and so on. In this regard, the mobile network provides the communication to the IoT device to perform the associated task thereof.

Optionally, determining the fault activity associated with the Internet of Things device is performed by one of: an communicably coupled to the Internet of Things device or a mobile network automation system communicably coupled to the Internet of Things platform. The term "mobile network automation system" as used herein refers to a system that automates the planning, deployment, operation and optimization of the mobile networks and their services. It will be appreciated that the mobile network automation system provides the manual tasks and processes performed in each stage of the mobile network to software applications that are able to complete them repeatably and reliably. Optionally, the mobile network automation system is configured with artificial intelligence and machine learning algorithms to provide mobile network automation system to learn the intent of network behaviours, deliver predictive analysis, and provide recommendations. Optionally, the mobile network automation system is operatively coupled with the IoT device as well as with the mobile network. It will be appreciated that the mobile network automation system is configured to receive the location information of the fault activity and run the automated action to determine whether the fault activity is associated with the IoT device or with the mobile network.

The term "IT platform" as used herein refers to an on-premise software or a cloud server that monitors, manages and controls various types of operations performed by the IoT device(s). In this regard, the IoT platform deploys a software application to manage the IoT devices to perform the associated tasks. Moreover, the IoT platform bridges the gap between device sensors and mobile network networks. Furthermore, the IoT platform provides an insight into the data used by the IoT devices in the backend application and allows the software application developers to remotely collect data, secure connectivity, execute sensor management and provide timely updates.

Moreover, the IoT platform manages the connectivity of the IoT devices to the mobile network and allows to build updated mobile software applications. The IoT platform also facilitates the collection of data from IoT devices and enables an uninterrupted flow of communication between the IoT devices. Moreover, the IoT platform helps in understanding the user needs better and provides the IoT devices that fulfil the requirements thereof.

Optionally, identifying the location information of the Internet of Things device is performed by one of: the Internet of Things platform or the mobile network automation system. It will be appreciated that identifying the location information through the IoT platform, can be done by the user by entering the location information manually or automatically by the IoT platform by checking the IMEI number of the device. In the case of the mobile network automation system, the location can be identified using the Internet Protocol (IP) address, media access control (MAC) address. Notably, the MAC is a unique identifier assigned to a network interface controller for use as a network address in communications within a network segment.

Optionally, determining whether the fault activity is associated with the mobile network corresponding to the location information comprises:
    sending as input, an automated message having the location information, by the Internet of Things platform to the mobile network automation system; and
    receiving as output, an automated message indicating whether the fault activity is associated with the mobile network, by the Internet of Things platform from the mobile network automation system.

Notably, the input is sent from the IoT platform, and the input may comprise the location information, usage information, time of the fault, time of last communication of IoT device with the mobile network. Optionally, based on the received input the mobile network automation system determines the criticality of the fault associated therewith. Moreover, the IoT platform receives the output from the mobile network automation system to indicate whether the fault activity is associated with the mobile network. Optionally, the sent input and received output can be a message, an e-mail, an alert or any combination thereof, and the received output may be a "Yes" or a "No" corresponding to whether the fault activity is associated with the mobile network or not, respectively.

It will be appreciated that once the fault activity is determined to be associated with the mobile network corresponding to the location information or not, the automation activity is performed by the IoT platform. The term "automation activity" as used herein refers to the technique of making a process, or a system operate automatically without any human intervention to resolve a fault activity in the IoT network. Notably, the automation activity can significantly reduce downtime and facilitate fault optimization more quickly. It will be appreciated that the automation activity is configured to generate the service ticker or the field service ticket for the determined fault activity if it is associated with the mobile network or IoT device, respectively. For example, the automation activity can be performed by an expert of the IoT platform from the back-end to determine the fault activity by running a system diagnosis associated with the mobile network automation system to check whether the fault is associated with the mobile network. If the fault is not associated with the mobile network, then the IoT device might be faulty. Beneficially, the implementation of the automation activity, improves the efficiency, reliability, and connectivity of the IoT device to the mobile network. It will be appreciated that the automation activity optimizes the fault detection in the IoT network by analyzing the root reason of the fault and determining the fault activity is associated with the mobile network or associated with the user IoT device in the IoT network.

The term "service ticket" as used herein refers to a textual description of the fault activity that is associated with the mobile network. Herein, the service ticket comprises the textual description of the fault activity in the mobile network that is generated at the mobile network automation system to efficiently analyze the fault activity and resolve the same. For example, the textual description may be a text about the fault written by the IoT user. In an exemplary scenario, the textual description includes "IoT device not working since morning". Further, the textual description may include a conversation associated with the fault activity between the user and a customer support executive or expert. Moreover, the resolution of the fault activity includes a proposed solution to the fault provided by the expert (for example, an IT engineer). In such exemplary scenario, the resolution based on the textual description: "IoT device working since morning" includes "Restart the IoT device" or "Restart the modem" as a solution. It will be appreciated that the service ticket may comprise additional information associated with the fault activity.

The term "fault correction" as used herein refers to a resolution provided by the customer support executive or expert to rectify the fault associated with the mobile network or the IoT device. In an example, the automation activity configured to correct the fault associated with the mobile network may search for the fault in the mobile network associated with the location information and provide a resolution to the user by providing a timeline by which the fault may be corrected by authorised personnel.

The term "field service" as used herein refers to deploying a worker, an engineer, a technician, or any other authorised personnel to the location information associated with the IoT device for repairing, maintenance or replacing the IoT device. Typically, the field service is performed in-person for resolving the fault activity associated with the IoT device. In this regard, the field service provides better user experience and reduces the creation of service tickets.

Optionally, the fault activity associated with the mobile network is selected from at least one of: an area-related problem, and an Access Point Name-related problem; and the fault activity associated with the Internet of Things device is selected from at least one of: a Key Performance Indicator threshold, an alarm threshold, a usage threshold. In this regard, the area-related problem may comprise fault in the network of the area due to construction, repairing or server down of the area. The Access Point Name (APN) is the name for the settings IoT device reads to set up a connection to the gateway between the mobile network and other networks. Typically, the APN contains the file having a set of instructions for the IoT device to connect to the mobile network further, the APN related problem prevents the IoT device to connect with the mobile network.

The term "key performance indicators" as used herein refers to the measure to track and analyse the user engagement with the IoT platform. The Key Performance Indicator includes when and where the user uses the IoT platform and the ways of connection by which the user connect or engage therewith. The term "usage threshold" as used herein refers to the sum of total used space by the sum of total free space. Typically, the usage threshold is the measure of the free space available in the IoT device to store data. Optionally, an alerting system raises an alarm when a value goes above the defined thresholds value. The term "alarm threshold" as used herein refers to sets the amount of time for the significant motion before the alert is activated.

Optionally, the system further comprising predicting the fault activity associated with the Internet of Things device using a machine learning model. The term "machine learning model" as used herein refers to a subset of artificial intelligence (AI) in which model are trained using training datasets. For example, the training dataset may be historical data, such as IoT device data, previous fault data, location data, and so forth, stored in a cloud server, to predict outcomes, future trends and draw inferences from patterns of the historical data. In this regard, the machine learning model is used to predict the fault activity associated with the IoT device in the IoT network. Optionally, the machine learning model is configured to separate the service tickets and the field service to reduce the redundancy from the mobile network automation system. The one or more machine learning models are trained on a task of separating the received plurality of tickets. In this regard, the machine learning models are trained based on a set of labelled data and the received plurality of tickets (i.e. the service tickets or the field service tickets), as samples. For example, the machine learning models are trained to classify each ticket in sub-category of the service tickets or the field service tickets. Optionally, the machine learning models may be re-trained based on new samples.

In one example, if the fault activity is detected in the IoT network, the machine learning model may raise an alert (a flag, a text or an alarm) to the mobile network automation system. In this regard, the mobile network automation system continually tries to connect with the IoT device having the fault associated therewith. Moreover, the machine learning model may be used for predicting the fault activity, generating the at least of: the service ticket or field service, resolving the fault, and optimizing the fault detection in the IoT network. Furthermore, the action performed can be used by the machine learning model or other artificial intelligence tools to be trained for future such scenarios.

Typically, such algorithms are a step-by-step computational procedure for solving the fault, similar to decision-making flowcharts, which are used for information processing, mathematical calculation, and other related operations. Notably, the aforementioned model reduces the computational complexity and provide powerful computing units to process the fault activity and optimize the fault detection in the IoT network. Beneficially, the aforementioned algorithms improve the performance of the automation activity by reducing the time required for determining the fault in the IoT network and the association of the fault by conventional methods.

The present disclosure also relates to the system as described above. Various embodiments and variants disclosed above apply mutatis mutandis to the system.

The term "processor" as used herein refers to a computational element that is operable to respond to and processes instructions that drive the system for optimizing fault detection in an Internet of Things network. The processor includes, but is not limited to, a microprocessor, a micro-controller, a complex instruction set computing (CISC) microprocessor, a reduced instruction set (RISC) microprocessor, a very long instruction word (VLIW) microprocessor, or any other type of processing circuit. Furthermore, the processor may refer to one or more individual processors, processing devices and various elements associated with a processing device that may be shared by other processing devices. Additionally, the one or more individual processors, processing devices and elements are arranged in various architectures for responding to and processing the instructions that drive the system.

The processor is configured to:
determine a fault activity associated with an Internet of Things device in the Internet of Things network;
identify a location information of the Internet of Things device;
determine whether the fault activity is associated with a mobile network corresponding to the location information;
perform one of an automation activity of:
generating a service ticket for fault correction of the mobile network, when the fault activity is associated with the mobile network, or
generating a field service ticket for fault correction of the Internet of Things device, when the fault activity is not associated with the mobile network.

Optionally, the processing arrangement employs information processing paradigms such as, machine learning, artificial intelligence, and cognitive modelling, for performing various tasks associated with predicting the fault activity in the IoT network.

Optionally, the processor is associated with one of: an Internet of Things platform communicably coupled to the Internet of Things device or a mobile network automation system communicably coupled to the Internet of Things platform, to determine the fault activity associated with the Internet of Things device. It will be appreciated that the processor of the IoT platform processes the communications from the IoT network and the mobile network automation system to efficiently determine and resolve the fault activity associated with the IoT network.

Optionally, the processor is associated with one of: the Internet of Things platform or the mobile network automation system, to identify the location information of the Internet of Things device.

Optionally, the processor is configured to determine whether the fault activity is associated with the mobile network corresponding to the location information by:
sending as input, an automated message having the location information, by the Internet of Things platform to the mobile network automation system; and
receiving as output, an automated message indicating whether the fault activity is associated with the mobile network, by the Internet of Things platform from the mobile network automation system.

Optionally, the processor is configured to determine
the fault activity associated with the mobile network from at least one of: an area-related problem, and an Access Point Name-related problem; and
the fault activity associated with the Internet of Things device from at least one of: a Key Performance Indicator threshold, an alarm threshold, a usage threshold.

Optionally, the processor is further configured to predict the fault activity associated with the Internet of Things device using a machine learning model.

Optionally, the location information comprises at least one of: a coordinate, an address, an international mobile subscriber identity of the Internet of Things device.

The present disclosure also relates to the computer program product as described above. Various embodiments and variants disclosed above apply mutatis mutandis to the computer program product.

The computer program product for optimizing fault detection in an Internet of Things network, the computer program product comprising a non-transitory machine-readable data storage medium having stored thereon program instructions that, when accessed by a processor, cause the processor to carry out the aforementioned method.

DETAILED DESCRIPTION OF THE DRAWINGS

Referring to FIG. 1, there is shown a flowchart 100 of steps of a method for optimizing fault detection in an Internet of Things network, in accordance with an embodiment of the present disclosure. At step 102, a fault activity associated with an Internet of Things device in the Internet of Things network is determined. At step 104, a location information of the Internet of Things device is identified. At step 106, determined is whether the fault activity is associated with a mobile network corresponding to the location information. At step 108, an automation activity is performed to: generate a service ticket for fault correction of the mobile network, when the fault activity is associated with the mobile network; or generate a field service ticket for fault correction of the Internet of Things device, when the fault activity is not associated with the mobile network.

The steps 102, 104, 106 and 108 are only illustrative and other alternatives can also be provided where one or more steps are added, one or more steps are removed, or one or more steps are provided in a different sequence without departing from the scope of the claims herein.

Figure 2:
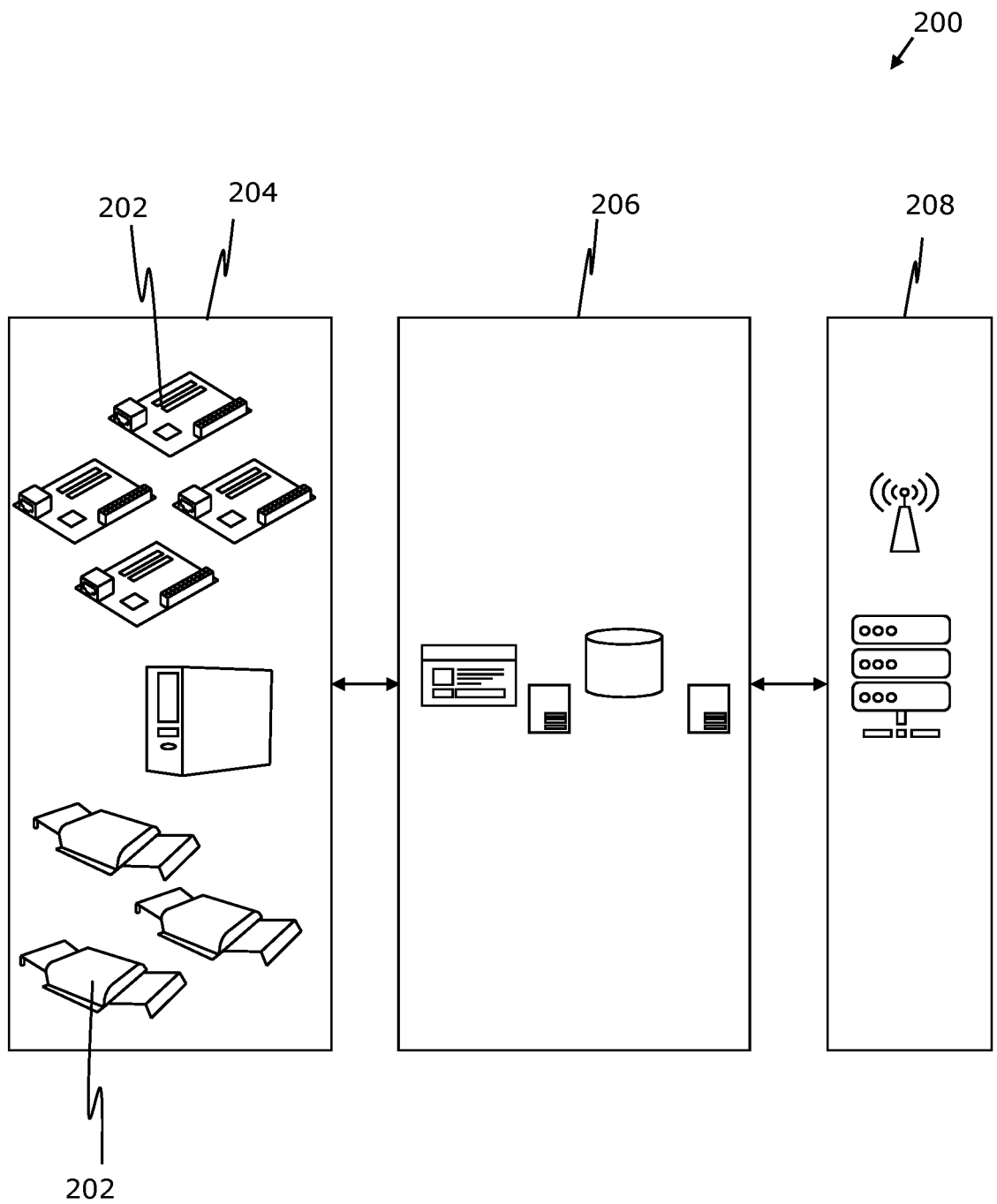
FIG. 2 is a schematic illustration of a system, in accordance with an embodiment of the present disclosure.

Referring to FIG. 2, illustrated is a system 200 for optimizing fault detection in an Internet of Things network, in accordance with an embodiment of the present disclosure. The system 200 comprises a processor (not shown) configured to determine a fault activity associated with an Internet of Things device 202 in the Internet of Things network 204. Moreover, the processor is configured to identify a location information of the Internet of Things device 202 and determine whether the fault activity is associated with a mobile network corresponding to the location information. Furthermore, the processor is configured to perform one of an automation activity of generating a service ticket for fault correction of the mobile network, when the fault activity is associated with the mobile network, or generating a field service ticket for fault correction of the Internet of Things device 202, when the fault activity is not associated with the mobile network. The processor is associated with one of: an Internet of Things platform 206 communicably coupled to the Internet of Things device 202 or a mobile network automation system 208 communicably coupled to the Internet of Things platform 206, to determine the fault activity associated with the Internet of Things device 202.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for optimizing fault detection in an Internet of Things network, the method comprising:
   determining a fault activity associated with an Internet of Things device in the Internet of Things network;
   identifying a location information of the Internet of Things device;
   determining whether the fault activity is associated with a mobile network corresponding to the location information, wherein the method comprises determining whether the fault activity is associated with the mobile network corresponding to the location information comprises:
   sending as input, an automated message having the location information, by the Internet of Things platform to a mobile network automation system; and
   receiving as output, an automated message indicating whether the fault activity is associated with the mobile network, by the Internet of Things platform from the mobile network automation system;
   generating a service ticket for fault correction of the mobile network, when the fault activity is associated with the mobile network, and
   generating a field service ticket for fault correction of the Internet of Things device, when the fault activity is not associated with the mobile network.

2. The method according to claim 1, wherein determining the fault activity associated with the Internet of Things device is performed by one of: an Internet of Things platform communicably coupled to the Internet of Things device or the mobile network automation system communicably coupled to the Internet of Things platform.

3. The method according to claim 2, wherein identifying the location information of the Internet of Things device is performed by one of: the Internet of Things platform or the mobile network automation system.

4. The method according to claim 1, wherein
   the fault activity associated with the mobile network is selected from at least one of: an area-related problem, and an Access Point Name-related problem; and
   the fault activity associated with the Internet of Things device is selected from at least one of: a Key Performance Indicator threshold, an alarm threshold, a usage threshold.

5. The method according to claim 4, further comprising predicting the fault activity associated with the Internet of Things device using a machine learning model.

6. The method according to claim 1, wherein the location information comprises at least one of: a coordinate, an address, an international mobile subscriber identity of the Internet of Things device.

7. A system for optimizing fault detection in an Internet of Things network, the system comprising a processor configured to:
   determine a fault activity associated with an Internet of Things device in the Internet of Things network;
   identify a location information of the Internet of Things device;
   determine whether the fault activity is associated with a mobile network corresponding to the location information, wherein the processor is configured to determine whether the fault activity is associated with the mobile network corresponding to the location information by:
  sending as input, an automated message having the location information, by the Internet of Things platform to a mobile network automation system; and
  receiving as output, an automated message indicating whether the fault activity is associated with the mobile network, by the Internet of Things platform from the mobile network automation system;
  generating a service ticket for fault correction of the mobile network, when the fault activity is associated with the mobile network, and
  generating a field service ticket for fault correction of the Internet of Things device, when the fault activity is not associated with the mobile network.

8. The system according to claim 7, wherein the processor is associated with one of: an Internet of Things platform communicably coupled to the Internet of Things device or the mobile network automation system communicably coupled to the Internet of Things platform, to determine the fault activity associated with the Internet of Things device.

9. The system according to claim 8, wherein the processor is associated with one of: the Internet of Things platform or the mobile network automation system, to identify the location information of the Internet of Things device.

10. The system according to claim 7, wherein the processor is configured to determine
  the fault activity associated with the mobile network from at least one of: an area-related problem, and an Access Point Name-related problem; and
  the fault activity associated with the Internet of Things device from at least one of: a Key Performance Indicator threshold, an alarm threshold, a usage threshold.

11. The system according to claim 10, wherein the processor is further configured to predict the fault activity associated with the Internet of Things device using a machine learning model.

12. The system according to claim 7, wherein the location information comprises at least one of: a coordinate, an address, an international mobile subscriber identity of the Internet of Things device.

13. A computer program product for optimizing fault detection in an Internet of Things network, the computer program product comprising a non-transitory machine-readable data storage medium having stored thereon program instructions that, when accessed by a processor, cause the processor to carry out the method of claim 1.

* * * * *